(12) United States Patent
Jeuk

(10) Patent No.: US 10,917,293 B2
(45) Date of Patent: Feb. 9, 2021

(54) CONTROLLER FOR BULK ONBOARDING

(71) Applicant: Cisco Technology, Inc., San Jose, CA (US)

(72) Inventor: Sebastian Jeuk, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 89 days.

(21) Appl. No.: 15/935,003

(22) Filed: Mar. 25, 2018

(65) Prior Publication Data

US 2019/0296973 A1 Sep. 26, 2019

(51) Int. Cl.
*H04L 12/24* (2006.01)
*H04L 29/08* (2006.01)
*H04W 4/70* (2018.01)
*H04L 12/28* (2006.01)

(52) U.S. Cl.
CPC ...... *H04L 41/0806* (2013.01); *H04L 12/2834* (2013.01); *H04L 41/0889* (2013.01); *H04L 67/12* (2013.01); *H04W 4/70* (2018.02); *H04L 12/2807* (2013.01)

(58) Field of Classification Search
CPC . H04L 67/12; H04L 12/2834; H04L 41/0806; H04L 41/0823; H04L 41/0889; H04L 12/2807; H04W 76/10; H04W 76/16; H04W 4/70
See application file for complete search history.

(56) References Cited

U.S. PATENT DOCUMENTS

| 8,984,277 B2 | 3/2015 | Dasgupta et al. |
| 9,596,603 B2 | 3/2017 | Spencer et al. |
| 9,699,659 B2 | 7/2017 | Zehavi et al. |
| 2013/0031608 A1* | 1/2013 | Alfano ............. H04W 12/0027 726/3 |

(Continued)

FOREIGN PATENT DOCUMENTS

| EP | 2019534 | 3/2011 |
| FR | 2761842 | 10/1998 |
| GB | 2424483 | 9/2006 |

OTHER PUBLICATIONS

Vogler et al., "A Scalable Framework for Provisioning Large-Scale IoT Deployments", Mar. 2016, ACM Transactions on Internet Technology, vol. 16, No. 2, Article 11. (Year: 2016).*

(Continued)

*Primary Examiner* — Gregory G Todd
(74) *Attorney, Agent, or Firm* — Behmke Innovation Group LLC; James M. Behmke; Jonathon P. Western

(57) ABSTRACT

In one embodiment, a system, apparatus and method is described, the system including a local controller by executed by a processor of an Internet of Things (IoT) device, the local controller being operative to perform, at least one of a push or a pull operation with at least one other IoT device, to request extended control functionality from a central controller, to receive extended control functionality from the central controller, to exercise said extended control functionality over the least one other IoT device, to receive an instruction from the central controller retracting control functionality and, in response to receiving said instruction, to retract said control functionality, and to receive a command to delete itself from the IoT device. Related systems, apparatus, and hardware are also described.

15 Claims, 4 Drawing Sheets

(56) References Cited

U.S. PATENT DOCUMENTS

| | | |
|---|---|---|
| 2013/0252583 A1 | 9/2013 | Brown et al. |
| 2014/0324973 A1* | 10/2014 | Goel ................. H04L 47/70 709/204 |
| 2015/0071216 A1 | 3/2015 | Ilsar et al. |
| 2015/0121470 A1 | 4/2015 | Rongo et al. |
| 2016/0037436 A1* | 2/2016 | Spencer ............ H04W 12/08 370/338 |
| 2017/0048785 A1* | 2/2017 | Ge .................. H04W 48/16 |
| 2017/0156076 A1* | 6/2017 | Eom ................ H04W 24/04 |
| 2018/0048710 A1* | 2/2018 | Altin ............... H04W 76/10 |
| 2019/0058697 A1* | 2/2019 | Chang ............. H04L 63/0428 |
| 2019/0124507 A1* | 4/2019 | Dotchkoff ........ H04L 63/083 |

OTHER PUBLICATIONS

Vogler et al., "LEONORE—Large-Scale Provisioning of Resource-Constrained IoT Deployments", 2015, 2015 IEEE Symposium on Service-Oriented System Engineering, pp. 78-87. (Year: 2015).*

* cited by examiner

CONTROLLER FOR BULK ONBOARDING

TECHNICAL FIELD

The present disclosure generally relates to methods and systems for Internet-of-Things (IoT) communications networks.

BACKGROUND

IoT systems typically comprise a network of physical devices, vehicles, consumer devices and appliances and/or other items which comprise embedded electronics, software, sensors, actuators, network connectivity, and so forth. IoT enables sensing or remotely controlling objects across existing network infrastructure. The ability to sense and/or to remotely control these objects often provides improved efficiency, accuracy and economic benefit. Additionally, human intervention is less needed with regard to operation and maintenance of these objects.

Onboarding, in the context of IoT systems, refers to a process of provisioning a client IoT device with credentials for accessing one or more network resources, and assigning appropriate permissions to the client IoT device. In some instances (e.g., large buildings or campuses), there are often a large number of IoT devices, e.g., IoT thermostats, IoT lighting, IoT appliances, and so forth, to onboard.

BRIEF DESCRIPTION OF THE DRAWINGS

The present disclosure will be understood and appreciated more fully from the following detailed description, taken in conjunction with the drawings in which.

DESCRIPTION OF EXEMPLARY EMBODIMENTS

Overview

In one embodiment, a system, apparatus and method is described, the system including a local controller by executed by a processor of an Internet of Things (IoT) device, the local controller being operative to perform at least one of a push or a pull operation with at least one other IoT device, to request extended control functionality from a central controller, to receive extended control functionality from the central controller, to exercise said extended control functionality over the least one other IoT device, to receive an instruction from the central controller retracting control functionality and, in response to receiving said instruction, to retract said control functionality, and to receive a command to delete itself from the IoT device. Related systems, apparatus, and hardware are also described.

Example Embodiments

An ability to onboard Internet of Things (IoT) devices is a key aspect of IoT environments. Being able to on-board a large set of IoT sensors (as one example) is a demanding task for sensor sides with limited bandwidth available, and other limitations in a local network. As on-demand, elastic, and dynamic controller system which enables mass onboarding in remotes sites is called for, given the state of the art. As will be seen below, both push and pull operations are supported, so that a central controller can dynamically extend/retract a local controller's functionality based on needs of a remote location. Additionally, in case of the pull operation, the remote location is able to request temporary local controller functionality.

Figure 1:
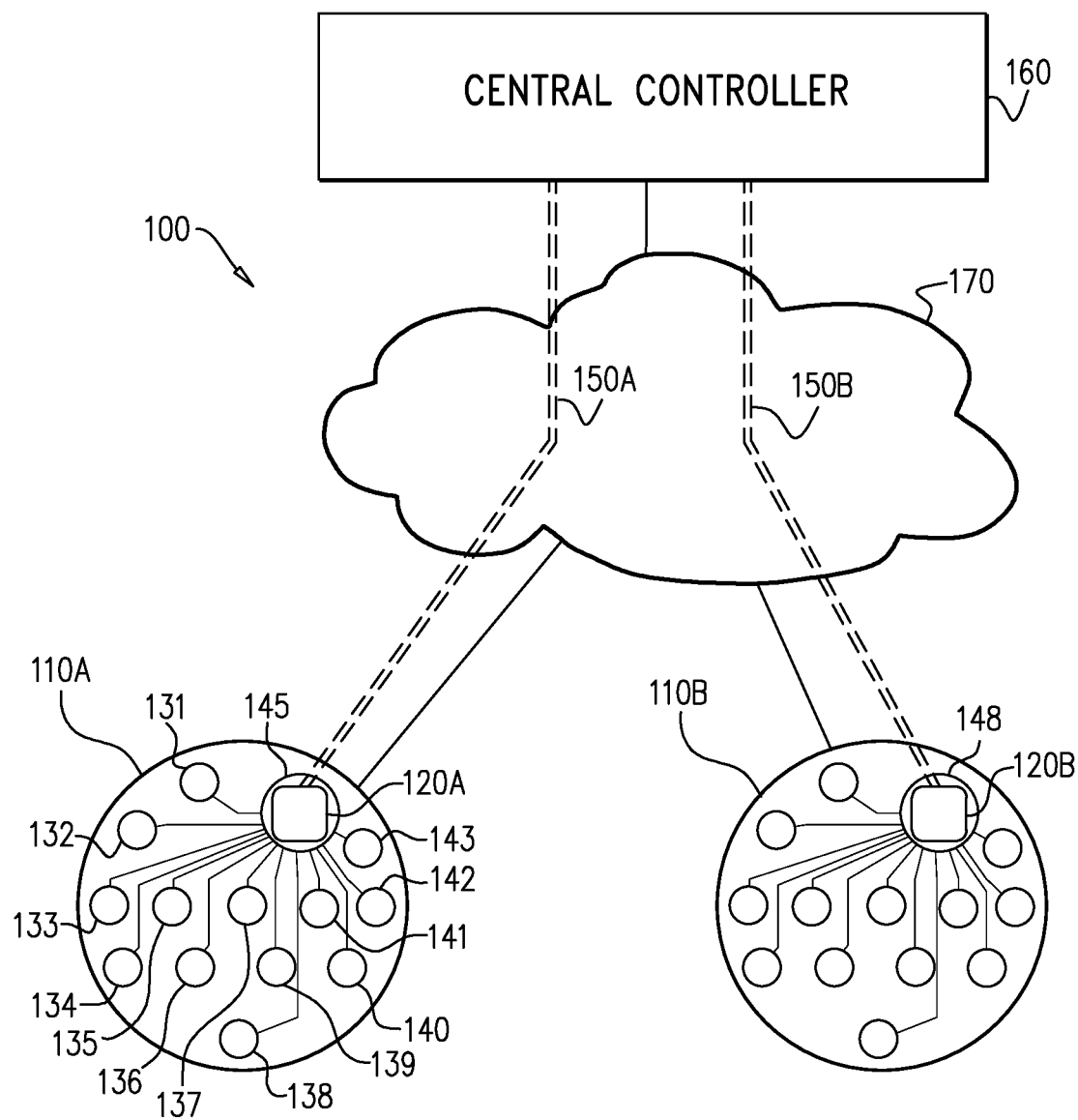
FIG. 1 is a simplified pictorial illustration of a network of IoT devices comprising a plurality of local controllers constructed and operative in accordance with an embodiment of the present disclosure.

Reference is now made to FIG. 1 which is a simplified pictorial illustration of a network 100 constructed and operative in accordance with an embodiment of the present disclosure. The network 100 comprises a first group of IoT devices 110A and a second group of IoT devices 110B (collectively, "groups of IoT devices 110A, 110B"). The first group of IoT devices 110A comprises a first local controller 120A, and the second group of IoT devices 110B comprises a second local controller 120B. The groups of IoT devices 110A, 110B may include a number of IoT devices, for example, in two distinct geographic locations, i.e., two different campuses or different buildings, by way of example. By way of example, such devices may include IoT devices 131-143 in the first group of IoT devices 110A and IoT device 148 in the second group of IoT devices 110B. The groups of IoT devices 110A, 110B may comprise sensors, thermostats, lightbulbs, etc., as is known in the art. Individual IoT devices 131-143 of the first group of IoT devices 110A may be in communication with an IoT device 145 which comprises the first local controller 120A (detailed below, with reference to FIG. 2), forming a first local communication network. It is noted that a second local communication network, similar to the first local communication network, applies to the second group of IoT devices 110B and the IoT device 148 which comprises the second local controller 120B.

It is appreciated that there might be communication between and among the IoT devices 131-143 which is not indicated in FIG. 1. Such communication is not indicated in order not to overly complicate FIG. 1.

The first local controller 120A and the second local controller 120B are in communication (indicated by dotted lines 150A, 150B) with a central controller 160 over a cloud 170 (or other network, e.g., local area network, metropolitan area network, wide area network, etc.). The communication by the first local controller 120A and the second local controller 120B with the central controller 160 is typically via a secure tunnel, for example, using secure shell (SSH) tunneling. Other methods known in the art may be used to secure the communication. For particularly sensitive networks, a virtual private network (VPN) may also be used to enhance security of communications. Individual IoT devices 131-143 may also be in communication with the central controller 160 over the cloud 170. By contrast to the communication between the first local controller 120A and the second local controller 120B, communication between the IoT devices 131-143 (and correspondingly, between the devices which make up the second group of IoT devices 110B) and the central controller 160 is typically not over the secure tunnel.

It is appreciated that because the central controller 160 typically manages IoT devices (e.g., groups of IoT devices 110A, 110B) across a large set of geographically disperse locations, relying on the central controller 160 to manage the onboarding of the remote IoT devices within remote (with respect to the central controller 160) locations may not be feasible. This is because reliance on the central controller 160 to manage the onboarding may result in over-utilization of potentially scarce resources, such as bandwidth, computing power, and so forth.

Figure 2:
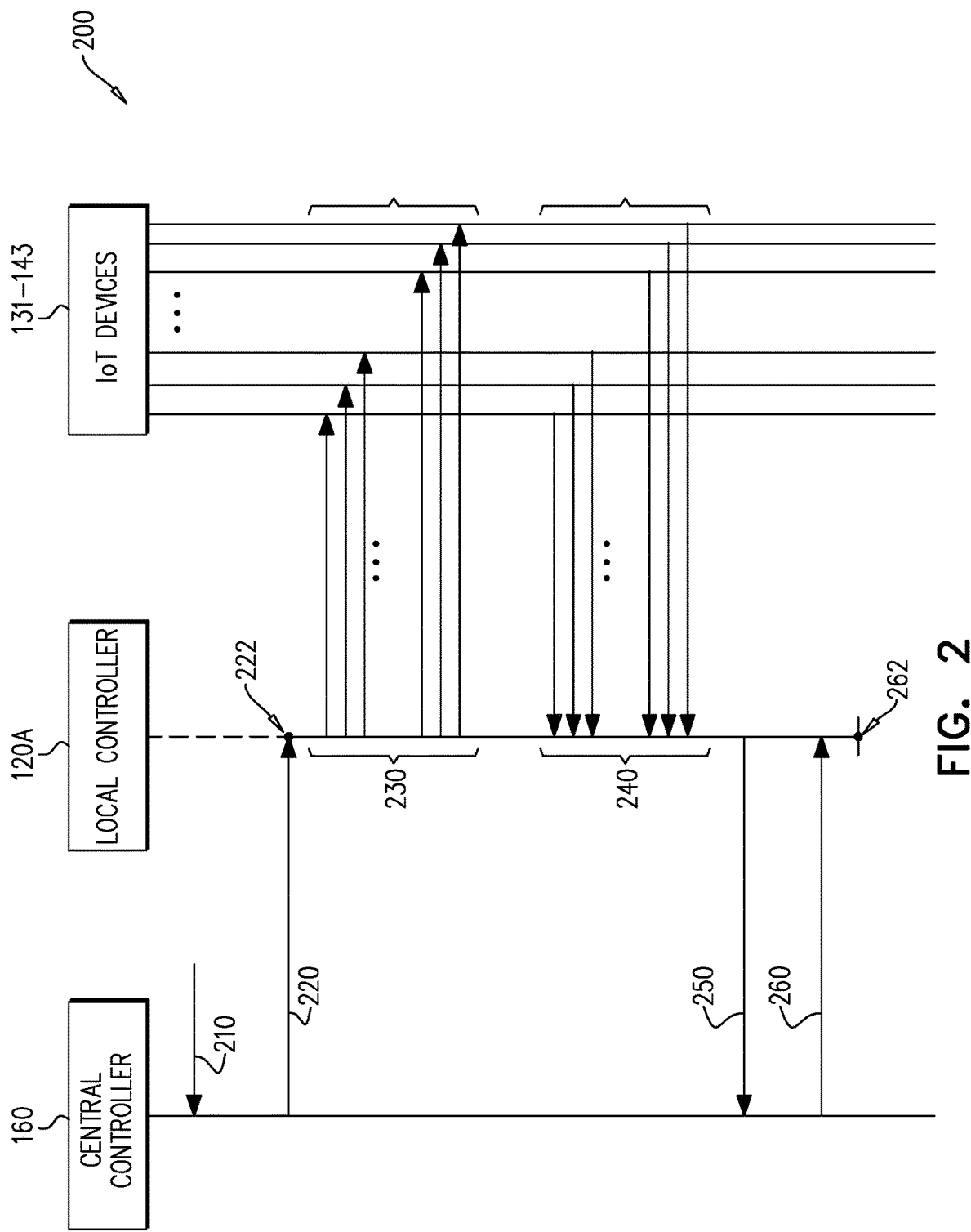
FIG. 2 is a data flow diagram for a pull embodiment in the network of IoT devices of FIG. 1.

Reference is now additionally made to FIG. 2, which is a data flow diagram 200 for a pull embodiment in the network 100. Upon receipt of a notification (step 210) from one or more locations comprising the first group of IoT devices 110A, the central controller 160 pushes the first local controller 120A to the location (step 220). It is appreciated that the notification which triggers the pushing of the first local controller 120A to the location by the central controller 160 may be triggered by other causes as well. By way of example the pushing of the first local controller 120A to the location may be triggered by an administrator, a tenant, a user of one of the IoT devices 131-143, the central controller 160 itself, etc. The first local controller 120A is pushed to the IoT device 145 in which the first local controller 120A is instantiated (at point 222) and comprised (or to another appropriate location within the local network comprising the first group of IoT devices 110A).

The first local controller 120A may be pushed to the IoT device 145 as a container, for example, using Kubernetes or Docker, or another appropriate tool, as is known in the art.

The first local controller 120A is now able to manage onboarding or other management tasks locally, rather than having the central controller 160 perform the management tasks on an individual basis the IoT devices 131-143. By way of example, in the case of onboarding, the first local controller 120A manages the local onboarding tasks. For example, in step 230, the first local controller 120A may begin the onboarding process by sending a request to the IoT devices 131-143 for them to reply with their onboarding information. At step 240, the first local controller 120A receives the onboarding information as it is sent by the IoT devices 131-143. It is appreciated that the flow of data indicated in steps 230 and 240 may occur in some other order than that which is shown in FIG. 2. The first local controller 120A then packages received onboarding information from the IoT devices 131-143, and returns the received onboarding information to the central controller 160, via the secure tunnel 150A (step 250). The received onboarding information is returned to the central controller 160 in a format appropriate for use by the central controller 160. Once the central controller 160 receives the received information from the first local controller 120A, the IoT devices 131-143 may now be controlled by the central controller 160. Upon completion of the onboarding or other management task, the central controller 160 may send an instruction to the IoT device 145 (step 260) that the first local controller 120A may be deleted (indicated at point 262).

In some embodiments, the first local controller 120A may be downloaded to the IoT device 145 in step 220 preconfigured with a set of parameters that define its life span. Parameters include (but are not limited to) a set of operations to be performed (i.e. onboard 1000 sensors), a certain time-frame, a set of packets transmitted, etc. It is appreciated that the set of parameters that define the lifespan of the first local controller 120A is provided by way of example, and other parameters may also be used to indicate end of lifespan of the first local controller 120A.

It is further appreciated that if the first local controller 120A loses its connection with the central controller 160, a substitute local controller (not depicted) may be spawned and pushed to one of the IoT devices in the first group of IoT devices (e.g., IoT device 133, by way of example). This substitute local controller may also have the ability to send a command to the IoT device 145, instructing the IoT device 145 to delete the first local controller 120A. Those of skill in the art will appreciate that a "hello/dead timer", as is known in the art may be used to determine if the first local controller 120A is no longer communicating. As is known in the art, a "hello/dead timer" sends out a "hello" packet at a first time interval. If the hello packet is not responded to in a given amount of time, the recipient of the hello packet is presumed to be non-responsive (i.e., "dead").

It is appreciated that in a similar fashion, the first local controller 120A may be used to execute a push operation. For example, at step 220, the first local controller 120A is pushed to the IoT device 145 (possibly using a container, as discussed above) in order to execute the push operation. For example, the push operation may be a firmware upgrade.

The first local controller 120A is instantiated in the IoT device 145 (at point 222), as discussed above. At step 230, the first local controller 120A may execute the push operation to the IoT devices 131-143. At step 240, the IoT devices 131-143 acknowledge to the first local controller 120A that the upgrade has been successfully performed. As was noted above, the various data flows indicated in steps 230 and 240 may be occur in a different sequence that the sequence depicted in FIG. 2. The first local controller 120A is able to notify the central controller 160 that the upgrade has been completed. The central controller 160 then may send an instruction to the IoT device 145 (step 260) that the first local controller 120A may be deleted at point 262.

The above description of FIG. 2 is, as was noted above, for an embodiment where the first local controller 120A is pushed to its location (at step 220). The following description, also referring to FIG. 2, is for an embodiment where the first local controller 120A is pulled to the location. By way of example, instead of step 210 being triggered by an external initiator, step 210 is initiated from within a segment of network 100 in which the second group of IoT devices 110B is situated. Once step 210 is triggered, the presently described embodiment proceeds as with the previously described embodiment (i.e., push instead of pull).

Figure 3:
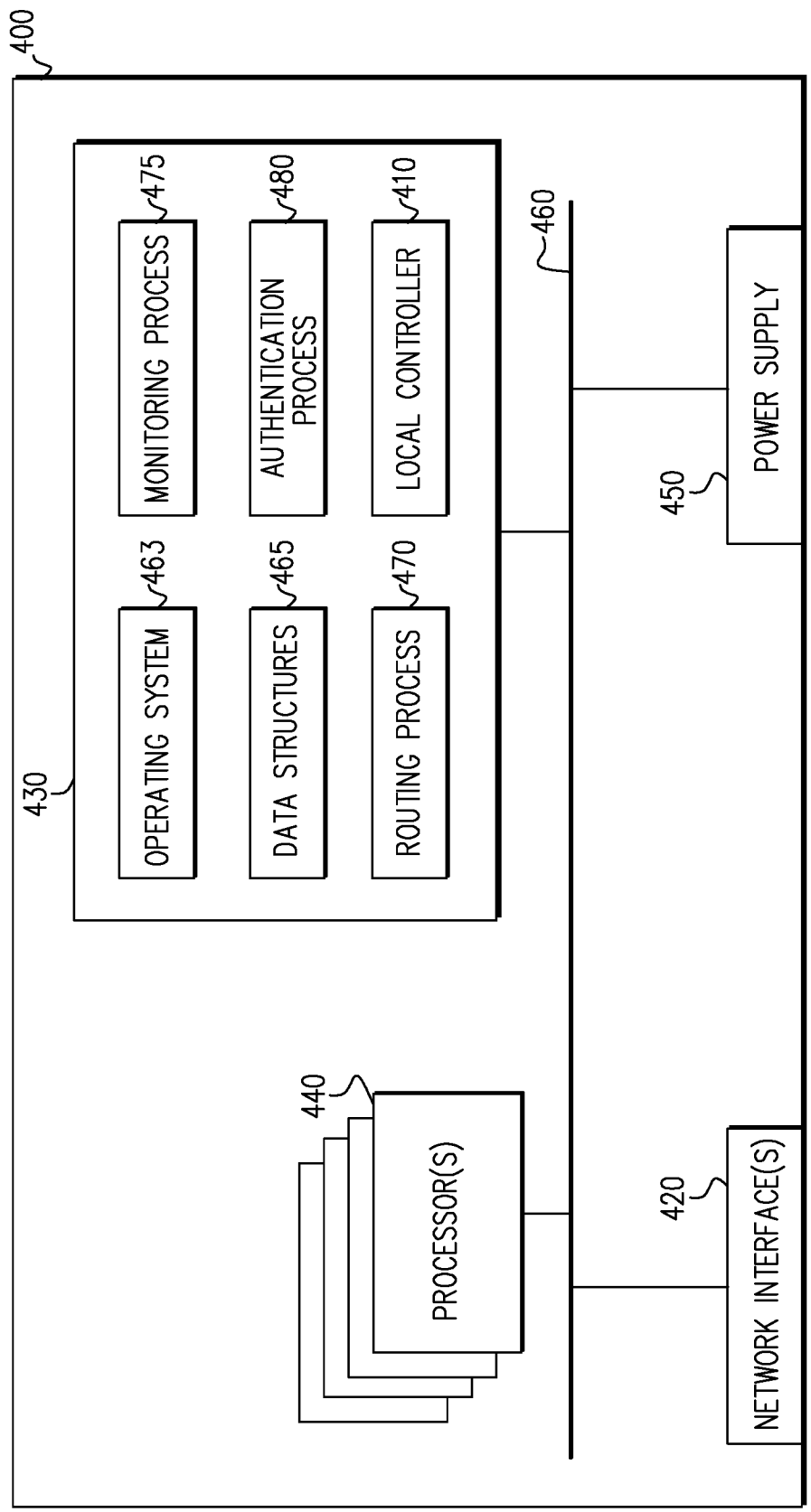
FIG. 3 is a schematic block diagram of a device in the network of an IoT device in the network of FIG. 1.

Reference is now made to FIG. 3, which is a schematic block diagram of a device 400 in the network 100 of FIG. 1. The device 400 is shown as comprising an instantiation of the local controller 410, corresponding to the first local controller 120A and to the second local controller 120B of FIG. 1. Accordingly, the device 400 may correspond to the IoT device 145 and/or the IoT device 148 (both of FIG. 1). In embodiments of the device 400 where the local controller 410 is absent, then the device may correspond to any of the IoT devices 131-143 (FIG. 1).

The device 400 may comprise one or more network interfaces 420, a memory 430, at least one processor 440, as well as a power supply 450 (e.g., battery, plug-in, etc.), interconnected by a system bus 460.

The one or more network interfaces 420 comprise mechanical, electrical, and signaling circuitry for communicating data over links coupled to the network 100 (FIG. 1). The one or more network interfaces 420 may be configured to transmit and/or receive data using a variety of different communication protocols, particularly shared-media protocols (e.g., wireless, power-line communication (PLC), etc.) for communication among the IoT devices 131-143 of FIG. 1, and optionally a wired protocol as well. That is to say, certain of the IoT devices 131-143, 145, 148 of FIG. 1, may have two or more different types of network interfaces 420, and the depiction in FIG. 3 is merely for illustration. Additionally, it is noted that while the one or more network interfaces 420 is depicted separately from the power supply 450, for PLC the network interface 420 may communicate through the power supply 450, or may be a component of the power supply 450.

The memory 430 comprises a plurality of storage locations that are addressable by the at least one processor 440. It is appreciated that some IoT devices among the IoT devices 131-143 of FIG. 1 may have limited memory or no memory (e.g., no memory for storage other than for programs/processes operating on the device and associated caches). The processor 440 may comprise elements or logic adapted to execute software programs and manipulate data structures 465. An operating system 463, portions of which are typically resident in memory 430 and executed by the at least one processor 440, functionally organizes the device 400 by, inter alia, invoking operations in support of software processes and/or services executing on the device 400. These software processes and/or services on the IoT devices 131-143, 145, 148 of FIG. 1 may comprise other processes, some of which are depicted in FIG. 3 by way of example, namely a routing process 470, a monitoring process 475 and an authentication process 480. Other processes, not explicitly depicted in FIG. 4 may also be resident in memory 430, and may include other applications which are operating on the device 400. Note that while some processes, such as, but not limited to, the monitoring process 475 and the authentication process 480 are depicted in the memory 430, in alternative embodiments, such processes may be operated, for example, in the one or more network interfaces 420.

Persons of skill in the art will appreciate that other processor and memory types, including various computer-readable media, may be used to store and execute program instructions pertaining to the embodiments described herein. Also, while the present disclosure illustrates various processes, it is expressly contemplated that various processes may be embodied as modules configured to operate in accordance with the embodiments disclosed herein (e.g., according to the functionality of a similar process). Further, while the processes have been shown separately, those skilled in the art will appreciate that certain processes may be implemented as routines or modules within other processes.

One of the at least one processor 440 may be a special purpose processor operative to perform the methods of the local controller 410 described herein above. The at least one processor 440 comprises dedicated hardware logic circuits, in the form of an application-specific integrated circuit (ASIC), field programmable gate array (FPGA), or full-custom integrated circuit, or a combination of such devices. Alternatively or additionally, some or all of the functions of the at least one processor 440 may be carried out by a programmable processor microprocessor or digital signal processor (DSP), under the control of suitable software. This software may be downloaded to the processor in electronic form, over a network, for example.

The memory 430 may comprise memory modules such a as a Random Access Memory (RAM), where machine readable instructions may reside during runtime, and a secondary memory. The secondary memory may include flash drive, etc., or a nonvolatile memory where a copy of machine readable instructions or software may be stored. The secondary memory may also include ROM (read only memory), EPROM (erasable, programmable ROM), EEPROM (electrically erasable, programmable ROM).

It will be apparent to one of ordinary skill in the art that one or more of the components of the exemplary device 400 may not be included and/or other components may be added as is known in the art. The exemplary device 400 shown in FIG. 4 is provided as an example of a possible platform that may be used, and other types of platforms may be used as is known in the art.

Figure 4:
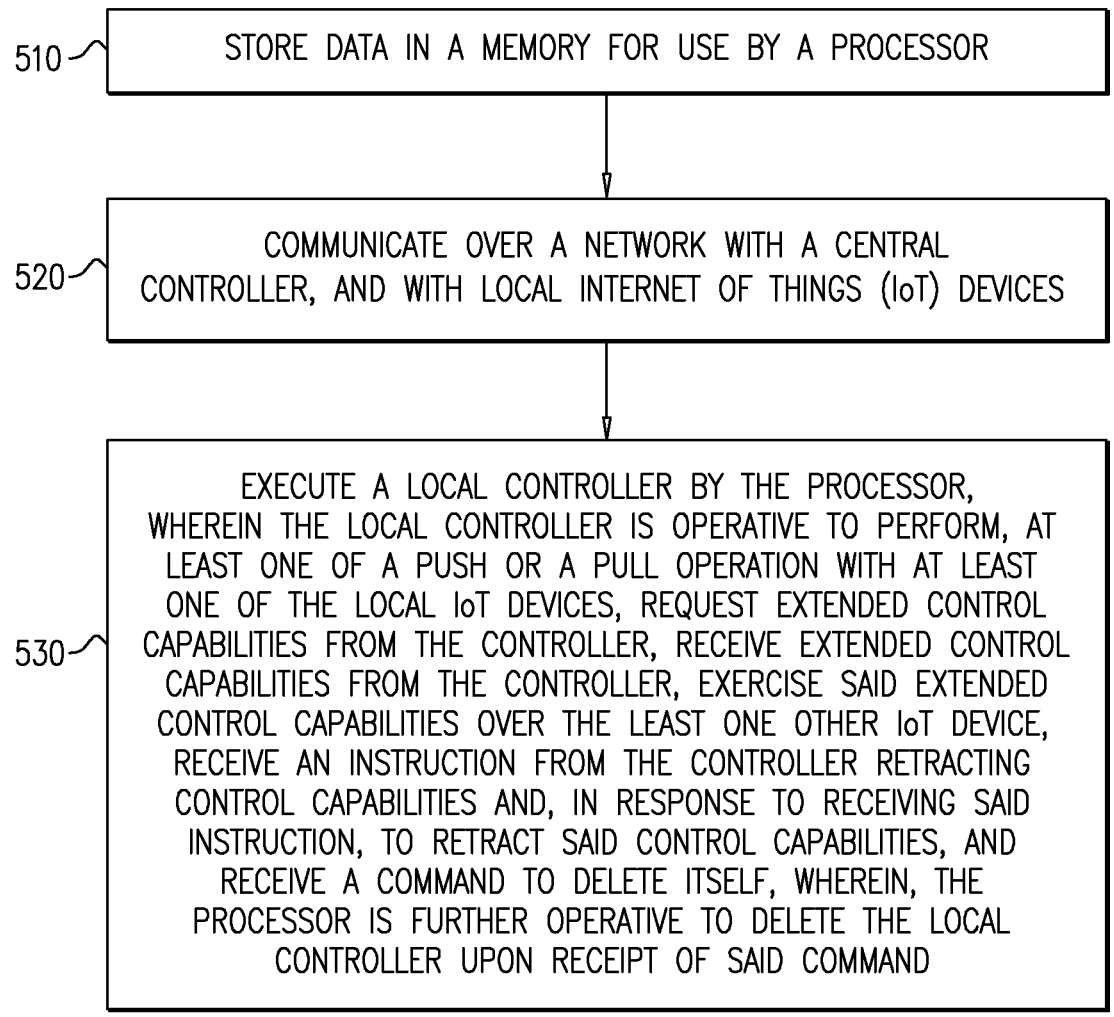
FIG. 4 is a flowchart diagram of a method of implementation of the system of FIG. 1.

Reference is now additionally made to FIG. 4, which is a flowchart diagram of a method of implementation of the system of FIG. 1. At step 510 data is stored in the memory 430 for use by the processor 440. At step 520 network communications are established over the network communications interface 420 with the central controller 160 (FIG. 1) and with local Internet of Things (IoT) devices, such as IoT devices 131-143 (FIG. 1) in the first group of IoT devices 110A (FIG. 1).

At step 530, the local controller 410 is executed by the processor 440, wherein the local controller 410 is operative to perform, at least one of a push or a pull operation with at least one of the local IoT devices, request extended control functionality from the central controller 160 (FIG. 1), receive extended control functionality from the central controller 160 (FIG. 1), exercise said extended control functionality over the least one other IoT device, receive an instruction from the central controller 160 (FIG. 1) retracting control functionality and, in response to receiving said instruction, to retract said control functionality, and receive a command to delete itself, wherein, the processor 440 is further operative to delete the local controller 410 upon receipt of said command.

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of embodiments which are, for clarity, described in the contexts of separate embodiments may also be provided in combination in a single embodiment. Conversely, various features of embodiments which are, for brevity, described in the context of a single embodiment may also be provided separately or in any suitable subcombination.

It will be appreciated by persons skilled in the art that embodiments described herein are not limited by what has been particularly shown and described hereinabove. Rather the scope of embodiments are defined by the appended claims and equivalents thereof.

What is claimed is:

1. A system comprising:
a processor;
a memory operative to store data used by the processor; and
a network interface operative to enable network communications with a central controller and to enable network communications with local Internet of Things (IoT) devices, wherein the central controller is located remotely of the local IoT devices and configured to manage onboarding of the local IoT devices, the processor configured to:
request control functionality from the central controller;
receive the control functionality by instantiating a local controller which is pushed from the central controller to transfer management of the onboarding the local IoT devices from the central controller to the local controller, wherein the local controller is instantiated at a particular one of the local IoT devices;

exercise the control functionality over the local IoT devices by performing one or more steps of an onboarding process of the local IoT devices, wherein the local controller and the local IoT devices are in a local network, and wherein the local controller collects information from the local IoT devices via a push or pull operation, packages the received information in a format appropriate for use by the central controller, and sends the packaged information to the central controller; and upon completion of the onboarding process of the local IoT devices, receive an instruction from the central controller retracting the control functionality and, in response to receiving the instruction, delete the local controller from the particular local IoT device.

2. The system according to claim 1 wherein the processor is configured to execute the local controller preconfigured with a set of parameters defining a life span of the local controller.

3. The system according to claim 2 wherein the set of parameters comprises a set of operations to be performed.

4. The system according to claim 2 wherein the set of parameters comprises a time-frame.

5. The system according to claim 2 wherein the set of parameters comprises a set of packets to be transmitted.

6. The system according to claim 1 wherein the local controller comprises a substitute local controller configured to replace a non-responsive local controller.

7. The system according to claim 1 wherein the local controller collects onboarding data from the local IoT devices, and forwards the onboarding data from a plurality of the local IoT devices to the central controller as a single package.

8. The system according to claim 1 wherein the control functionality reverts to the central controller upon retraction of the control functionality from the local controller by the central controller.

9. The system according to claim 1 wherein the local controller is pushed to one local IoT device by the central controller in a container.

10. The system according to claim 1 wherein the local controller communicates with the central controller via a secure tunnel built between the local controller and the central controller.

11. The system according to claim 10 wherein the push operation comprises pushing an update to the local IoT devices.

12. The system according to claim 10 wherein the pull operation comprises pulling onboarding information from the local IoT devices.

13. A method comprising:

requesting, by a local controller, control functionality from a central controller configured to manage onboarding of local IoT devices, wherein the central controller is located remotely of the local IoT devices;

receiving, at the local controller, the control functionality by instantiating a local controller which is pushed from the central controller to transfer management of the onboarding the local IoT devices from the central controller to the local controller, wherein the local controller is instantiated at a particular one of the local IoT devices;

exercising, by the local controller, the control functionality over the local IoT devices by performing one or more steps of an onboarding process of the local IoT devices, wherein the local controller and the local IoT devices are in a local network, and wherein the local controller collects information from the local IoT devices via a push or pull operation, packages the received information in a format appropriate for use by the central controller, and sends the packaged information to the central controller; and upon completion of the onboarding process of the local IoT devices, receiving, at the local controller, an instruction from the central controller retracting the control functionality and, in response to receiving said instruction, deleting the local controller from the particular local IoT device.

14. The method according to claim 13 wherein the local controller is preconfigured with a set of parameters defining a life span of the local controller.

15. The method according to claim 14 wherein the set of parameters comprises one of:

a set of operations to be performed;
a time-frame; or
a set of packets to be transmitted.

* * * * *